US008979155B2

(12) United States Patent
Hedrick et al.

(10) Patent No.: US 8,979,155 B2
(45) Date of Patent: Mar. 17, 2015

(54) APPARATUS, SYSTEM, AND PROCESS FOR THE AUTOMATED RETRIEVAL AND PRECISE PLACEMENT OF SMALL RODS

(71) Applicant: MPI Incorporated, Poughkeepsie, NY (US)

(72) Inventors: Keith Hedrick, Modena, NY (US);
Aaron Phipps, Poughkeepsie, NY (US);
Matthew Dina, Marlboro, NY (US);
Daniel Sapio, Hyde Park, NY (US)

(73) Assignee: MPI Incorporated, Poughkeepsie, NY (US)

( * ) Notice: Subject to any disclaimer, the term of this patent is extended or adjusted under 35 U.S.C. 154(b) by 139 days.

(21) Appl. No.: 13/849,026

(22) Filed: Mar. 22, 2013

(65) Prior Publication Data
US 2014/0286742 A1   Sep. 25, 2014

(51) Int. Cl.
*B25J 15/02*      (2006.01)
*B25J 15/00*      (2006.01)

(52) U.S. Cl.
CPC ............ *B25J 15/0042* (2013.01); *Y10S 901/37* (2013.01); *Y10S 901/39* (2013.01); *Y10S 294/902* (2013.01); *B25J 15/0253* (2013.01)
USPC ................ 294/207; 294/902; 901/37; 901/39

(58) Field of Classification Search
CPC ............... B25J 15/0028; B25J 15/0042; B25J 15/0253; B65G 47/901; Y10S 294/902; Y10S 901/37; Y10S 901/39; B23Q 7/04
USPC ......... 294/119.1, 207, 902; 414/745.2, 751.1, 414/589, 221.13, 225.01; 901/37, 39
See application file for complete search history.

(56) References Cited

U.S. PATENT DOCUMENTS

| | | | | |
|---|---|---|---|---|
| 4,448,405 A | * | 5/1984 | Cipolla | 269/32 |
| 4,653,794 A | * | 3/1987 | Atlas | 294/207 |
| 4,699,414 A | * | 10/1987 | Jones | 294/119.1 |
| 4,819,978 A | * | 4/1989 | Scheinman et al. | 294/119.1 |
| 4,865,375 A | * | 9/1989 | Laub et al. | 294/207 |
| 7,322,623 B2 | * | 1/2008 | Morton | 294/119.1 |
| 2003/0079342 A1 | * | 5/2003 | Revel et al. | 29/854 |
| 2009/0067973 A1 | * | 3/2009 | Eliuk et al. | 414/729 |
| 2011/0097185 A1 | * | 4/2011 | Braun et al. | 414/800 |
| 2012/0060514 A1 | * | 3/2012 | Warhurst et al. | 62/3.6 |

* cited by examiner

*Primary Examiner* — Dean Kramer
(74) *Attorney, Agent, or Firm* — Heslin Rothenberg Farley & Mesiti P.C.; Andrew K. Gonsalves, Esq.

(57) ABSTRACT

The present invention provides an apparatus for automated vertical placement of a small rod at a predetermined location, where the apparatus includes a parallel pneumatic gripper having a driver mechanism and a double-v shaped interlocking jaw assembly configured to receive, secure, and release a small rod in a substantially vertical position in response to corresponding signals generated by the driver mechanism. The present invention also provides a robotic system for automated gross retrieval and precise placement of a small rod. The present invention further provides a process for automated gross retrieval of at least one small rod and subsequent precise and substantially vertical placement thereof into a platform at a predetermined location and at a predetermined depth.

19 Claims, 15 Drawing Sheets

CLOSED

OPEN

OPEN

CLOSED

OPEN

CLOSED

FIGURES FOR DROP-OFF ZONE
AND PREDETERMINED DEPTH

APPARATUS, SYSTEM, AND PROCESS FOR THE AUTOMATED RETRIEVAL AND PRECISE PLACEMENT OF SMALL RODS

TECHNICAL FIELD

This invention relates generally to the field of automated pickup and placement of small rods and, more specifically, to an apparatus, robotic system, and process for automated vertical placement of small rods at a predetermined location.

BACKGROUND OF THE INVENTION

The accurate and efficient placement of small rods in machined holes is important in a number of applications. In such applications, the automation of the placement of the small rods provides a degree of efficiency that is needed to make the applications commercially viable. Systems that use robotic technology have been developed in order to aid in the automated placement of small rods at desired locations. In general, these systems use a robotic arm to retrieve a small rod from one location and then transport and deposit the small rod at the desired end location. Most of the time the rod is deposited in a substantially vertical orientation.

Pneumatic grippers have been used along with the robotic technology as the effector portion of the robotic arm that actually interacts with the small rods. In particular, the pneumatic grippers are able to clamp around the small rod to retrieve the rod at a holding station and maintain the rod until the pneumatic gripper is positioned above the desired end location for the small rod. The pneumatic gripper then is influenced to release the small rod at the desired end location.

Unfortunately, prior to the present invention, automated systems that involve the use of robotic technology coupled with pneumatic grippers have not been as accurate, efficient, and repeatable as is needed for the placement of small rods in precision machined holes. Further, the existing robotic technology is deficient for the placement of small rods at desired depths within the precision machined holes, because the existing robotic technology often fails to meet compliance standards, thereby leading to the small rods being damaged during the automated placement of the small rods.

Therefore, these is a need for an automated system for retrieving and placing small rods in precision machined holes at desired depths in a manner that is more accurate and efficient than existing robotic rod placement systems.

The present invention is directed to overcoming these and other deficiencies in the art.

SUMMARY OF THE INVENTION

The present invention provides, in a first aspect, an apparatus for automated vertical placement of a small rod at a predetermined location, where the apparatus includes a parallel pneumatic gripper having a driver mechanism and a double-v shaped interlocking jaw assembly configured to receive, secure, and release a small rod in a substantially vertical position in response to corresponding signals generated by the driver mechanism. The double-v shaped interlocking jaw assembly includes a first v-shaped jaw component and a second v-shaped jaw component that, when signaled to close by the driver mechanism, translate toward each other and surround the rod and interlock at their terminal ends to clamp the rod therebetween in a substantially vertical position.

The present invention provides, in a second aspect, a robotic system for automated gross retrieval and precise placement of a small rod. The robotic system includes: (i) a programmable robot having a robot controller, a robot arm, and an end effector coupled thereto, with the controller being adapted to control the robot arm and end effector through a predetermined sequence of movements to sequentially pick up at least one small rod from a pickup zone and release it at a precise location on a drop-off zone; and (ii) a parallel pneumatic gripper coupled to the end effector, where the parallel pneumatic gripper includes a driver mechanism and a double-v shaped interlocking jaw assembly configured to receive, secure, and release the at least one small rod in a substantially vertical position in response to corresponding signals generated by the driver mechanism. The double-v shaped interlocking jaw assembly of the parallel pneumatic gripper includes a first v-shaped jaw component and a second v-shaped jaw component that, when signaled to close by the driver mechanism, translate toward each other and surround the rod and interlock at their terminal ends to clamp the rod therebetween in a substantially vertical position.

In one embodiment, the robotic system further includes a pickup zone having a stage adapted to provide the at least one small rod in a substantially vertical position for gross retrieval thereof by the parallel pneumatic gripper.

In another embodiment, the robotic system further includes a drop-off zone having a platform that includes at least one predetermined location for precise placement of the at least one small rod in a substantially vertical position at a predetermined depth. In another embodiment, the robotic system includes both the pickup zone and the drop-off zone.

The present invention provides, in a third aspect, a process for automated gross retrieval of at least one small rod and subsequent precise substantially vertical placement thereof into a platform at a predetermined location and at a predetermined depth. This process involves: (i) providing a robotic system of the present invention; (ii) supplying at least one small rod in a substantially vertical position on the stage of the pickup zone of the robotic system; (iii) securing the at least one small rod in a substantially vertical position in the double-v shaped interlocking jaw assembly of the parallel pneumatic gripper of the robotic system; and (iv) depositing the at least one small rod in a substantially vertical position in a predetermined location and at a predetermined depth on the platform of the drop-off zone of the robotic system.

The present invention provides a number of advantages over the existing art. For example, the present invention provides an apparatus and robotic system that is effective to retrieve a small rod and place it into a precision machined hole at a desired depth. Further, the apparatus and robotic system of the present invention are able to achieve this in an automated and repeatable fashion.

Other additional features and benefits will become apparent from the following drawings and descriptions of the invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the end of the specification. The foregoing and other objects, features, and advantages of the invention are apparent from the following detailed description taken in conjunction with the accompanying drawings, as briefly described below.

FIG. 1A is a view of the apparatus in its closed position. FIG. 1B is a view of the apparatus in its open position.

FIG. 3A is a view of the apparatus with the double v-shaped interlocking jaw assembly in its open position. FIG. 3B is a view of the apparatus with the double v-shaped interlocking jaw assembly in its closed position.

FIG. 4A is a view of the apparatus with the double v-shaped interlocking jaw assembly in its open position. FIG. 4B is a view of the apparatus with the double v-shaped interlocking jaw assembly in its closed position.

FIG. 5A is a front view of the apparatus and a pickup zone for the small rods. FIG. 5B is an isometric view of the apparatus and a stage containing the pickup zone for the small rods.

FIG. 6A is a close view of a pickup zone with a plurality of small rods read for pickup and placed in the holes on the stage of the pickup zone. FIG. 6B is an isometric view of a drop-off zone having a plurality of small rods placed in holes of the platform and at a predetermined depth. FIG. 6C is a side, cut away view of a drop-off zone having a plurality of small rods placed in holes of the platform and at a predetermined depth.

FIG. 7A is a front view of an apparatus of the present invention with schematics to depict the programmable robot as including a robot controller, a robot arm, and an end effector coupled thereto. FIG. 7B is an isometric view of an apparatus of the present invention with schematics to depict the programmable robot as including a robot controller, a robot arm, and an end effector coupled thereto.

DETAILED DESCRIPTION

Figure 1A:
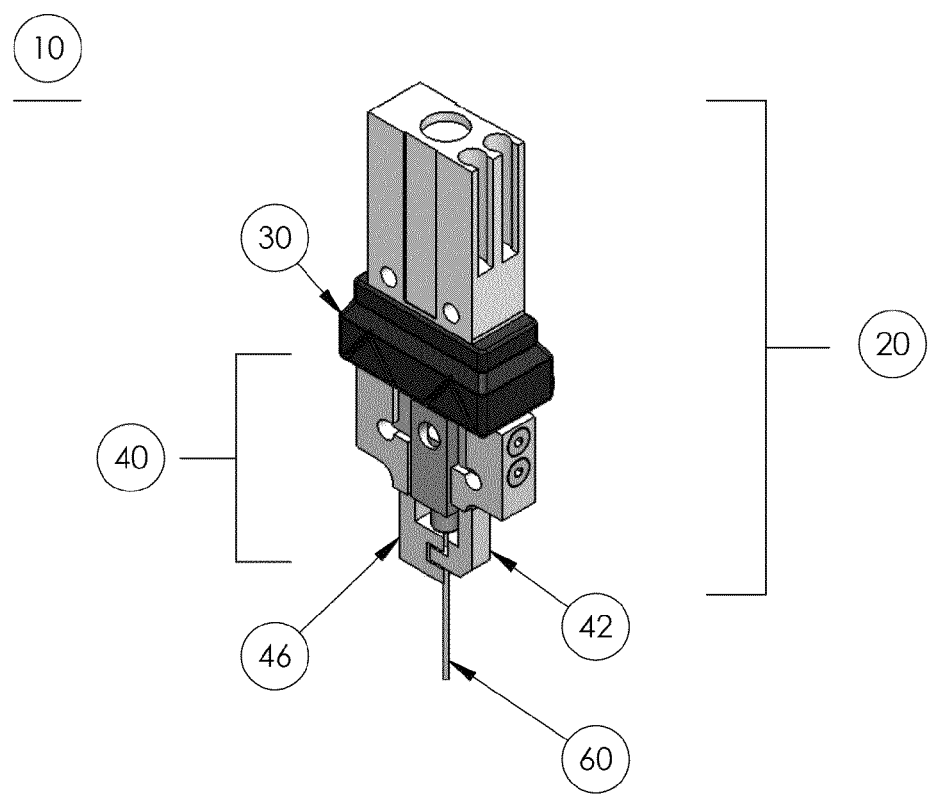
FIGS. 1A and 1B depict various isometric views of an embodiment of an apparatus for automated vertical placement of a small rod at a predetermined location, in accordance with an aspect of the present invention.

Generally stated, disclosed herein are inventions relating to an apparatus, robotic system, and process for automated vertical placement of small rods. The present invention provides for and enables the precise and automated retrieval and placement of small rods into precision machined holes. The present invention also provides for compliance in the placement of the small rods, thereby allowing the rods to be placed to an accurate depth without being damaged. The present invention advances the state of the art with respect to robotic systems for placing small rods, as the present invention can be used to retrieve and place rods of any size where the placement precision requirement is greater than what has been achievable by existing robot systems prior to the present invention.

For the purposes of promoting an understanding of the present invention and associated principles thereof, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the present invention relates.

In one aspect, the present invention provides an apparatus for the automated vertical placement of a small rod at a predetermined location.

As used herein, the term "small rod" refers to any substantially circular rod having a small diameter, any substantially square rod having a small diagonal, or any other multi-sided rod having a small cross sectional measurement. A substantially circular rod refers to a rod that has a circular or substantially circular cross section. A substantially square rod refers to a rod that has a square or substantially square cross section. As used herein, a substantially square rod also refers to a rod having a rectangular cross section. A multi-sided rod refers to a rod that has a cross section having multiple sides, other than four sides. For example, a multi-sided rod can include, without limitation, a rod having three sides, five sides, six sides, seven sides, eight sides, etc.

As used herein, "small diameter" includes a diameter of between about 0.020 inches and about 0.20 inches. As used herein, "small diagonal" includes a diagonal of between about 0.020 inches and about 0.20 inches. As used herein, "small cross sectional measurement" includes a cross section measurement of between about 0.020 inches and about 0.20 inches.

The small rods of the present invention can be of any length that complements the width (e.g., diameter, cross sectional diagonal) of the small rod, including, without limitation, lengths of between about 0.25 inches and about 3.0 inches.

Various aspects and embodiments of this apparatus are illustratively shown in FIGS. 1-4.

Figure 1B:
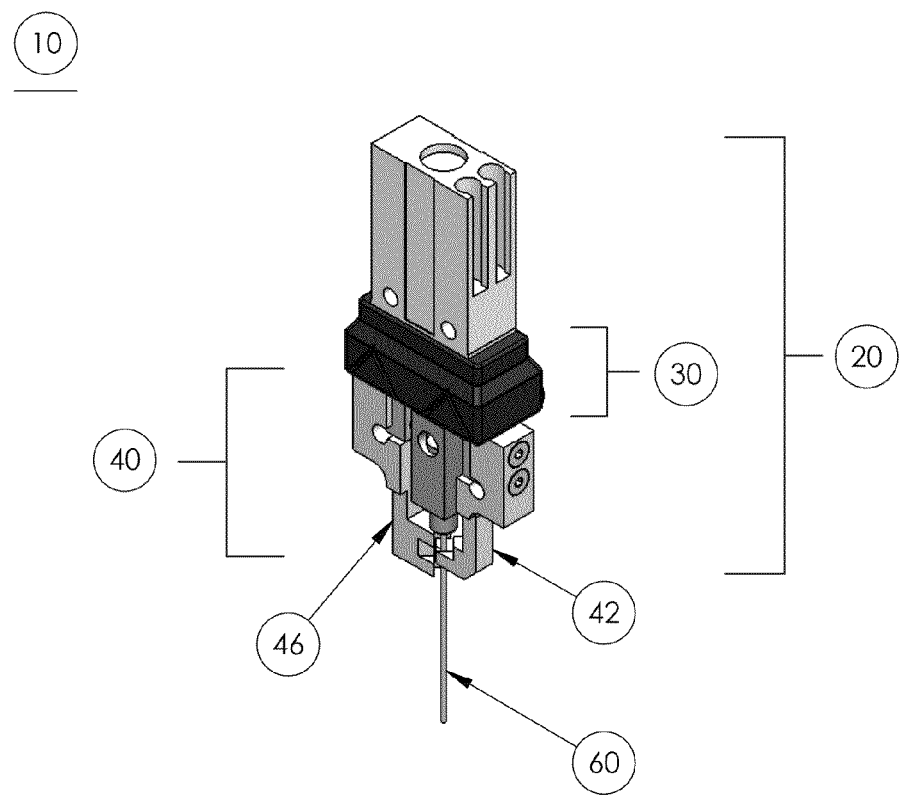

Referring now to FIGS. 1A and 1B, in one embodiment, apparatus 10 includes parallel pneumatic gripper 20 having driver mechanism 30 and double-v shaped interlocking jaw assembly 40 configured to receive, secure, and release small rod 60 in a substantially vertical position in response to corresponding signals generated by driver mechanism 30.

Pneumatic grippers are known in the art and are generally useful as motion devices to mimic such human motor skills as gripping items, e.g., as the fingers of a human hand are able to grip items. Pneumatic grippers are known in the art to be pneumatically powered, either by air pressure or by a fluid under pressure. In a general configuration, a pneumatic gripper includes a cylinder and piston mechanism that operates via compressed air, and further includes jaws that grip the item of interest. For example, during operation, when air is supplied to a pneumatic gripper, the jaws are influenced to close on the item of interest (e.g., a small rod). The jaws of the pneumatic gripper can maintain their grip of the item for a period of time, particularly while a desired operation is being performed. In order to signal the jaws to release the item, the direction of the air supplied to the pneumatic gripper is changed, thereby causing the gripper's jaws to open and release the item. Disclosures of pneumatic technology and particularly pneumatic grippers capable of being adapted by one of ordinary skill in the art to the present invention are found in various documents, including, for example, in U.S. Pat. No. 4,437,386 to Baumgartner, U.S. Pat. No. 7,883,132 to Maffeis, U.S. Pat. No. 7,976,087 to Maffeis, U.S. Pat. No. 8,091,938 to Maffeis, and U.S. Pat. No. 7,258,378 to Bellandi et al., which are hereby incorporated by reference herein in their entirety.

Various types of pneumatic grippers are known in the art. Generally, the types of pneumatic grippers can be distinguished by their gripping action. There are generally two broad types of gripping actions used for pneumatic grippers: external grippers and internal grippers. An external gripper holds the item when the gripper jaws are closed, while an internal gripper holds an item from the center while the gripper jaws are in an open position and exerting an outwardly extending force in opposite directions in order to hold the item in place. Pneumatic grippers are also categorized based on how the jaws of the gripper move when closing and opening. There are generally two broad categories regarding this categorization: two jaw parallel grippers and two jaw angular grippers. Parallel grippers are known in the art to have jaws that open and close parallel to the item to be held by the gripper. Angular grippers are known in the art to have jaws that move in a radial manner, so that rotating the jaws toward and away from the item of interest requires are larger range of motion than that required by parallel grippers. It is also known in the art that the gripping force of pneumatic grippers is rated in terms of air pressure. Therefore, increasing the air pressure by a certain percentage will increase the gripping force by that same percentage (up to the gripper's maximum air pressure rating). An air regulator can be used to reduce the force of the gripper.

Notwithstanding the general knowledge in the field, as used herein, in describing the aspects and embodiments of the present invention, the term "parallel pneumatic gripper" generally refers to a pneumatic gripper having two separate jaws that open and close in a parallel fashion relative to a horizontal plane, with the jaws of the gripper moving toward and away from one another along that horizontal plane. In particular, a "parallel pneumatic gripper" of the present invention is configured to hold a small rod in a vertical or substantially vertical position relative to the aforementioned horizontal plane. Therefore, the parallel pneumatic gripper of the present invention generally belongs to the two jaw parallel gripper category, and includes jaws having external gripping action, in that the pneumatic gripper of the present invention grips or clamps onto the small rod when the jaws of the pneumatic gripper are in a closed position.

One important aspect of the present invention relates to the unique configuration of the jaws of the parallel pneumatic gripper of the present invention. In particular, the double-v shaped interlocking jaw assembly provides, for the first time, gripping action that provides compliance of the gripper when in an open position, which functions to enable the small rod to settle at a repeatable position within the complementary v-shaped jaws of the double-v shaped interlocking jaw assembly. The v-shaped jaws, which combine to form a double-v shaped cavity when in an open position, allow for small rods to be picked up from a location that grossly positions the small rods. The compliance in the double-v shaped interlocking jaw assembly allows the small rods to be picked up from a rough position (also referred to herein as a "gross position") and then clamped with precision. Because the position of the small rods within the double-v shaped interlocking jaw assembly is precise and repeatable, the present invention provides for the precise placement of the small rods in desired precision machined holes that are only slightly larger in diameter than the small rods.

By way of an example, and not intending in any way to be limited thereto, in one embodiment the small rod can be a small diameter rod having a diameter of about 0.022 inches and the robotic system can accurately and repeatedly place a plurality of such small diameter rods into a precision machined hole that has a diameter of about 0.024 inches. As noted, this example is not meant to be limiting of the currently claimed invention, but instead is meant to provide a particular example to demonstrate the precision with which the apparatus, robotic system, and process of the present invention operate.

Returning now to FIGS. 1A and 1B, in one embodiment of apparatus 10 of the present invention, double v-shaped interlocking jaw assembly 40 includes first v-shaped jaw component 42 and second v-shaped jaw component 46. During operation, when signaled to close by driver mechanism 30, first v-shaped jaw component 42 and second v-shaped jaw component 46 translate toward each other and surround rod 60 and interlock at their terminal ends to clamp rod 60 therebetween in a substantially vertical position.

Figure 2A:
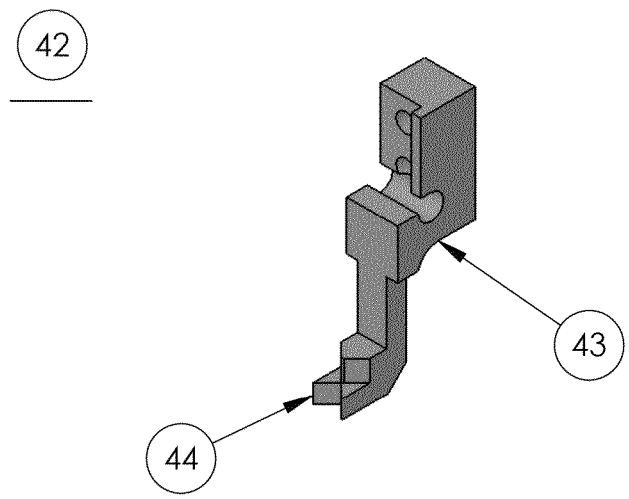
FIGS. 2A, 2B, and 2C depict isometric views of the first v-shaped jaw component (FIG. 2A), the second v-shaped jaw component (FIG. 2B), and the double v-shaped interlocking jaw assembly (FIG. 2C) with the first and second v-shaped jaw components operationally engaged with one another.
Figure 2B:
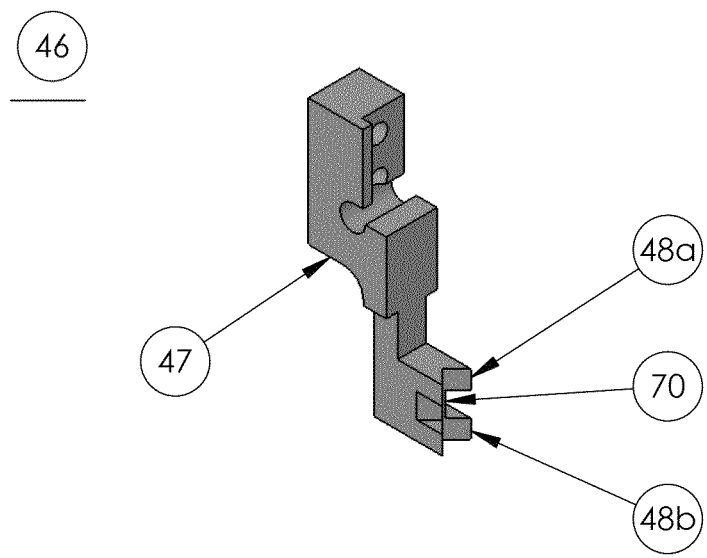
Figure 2C:
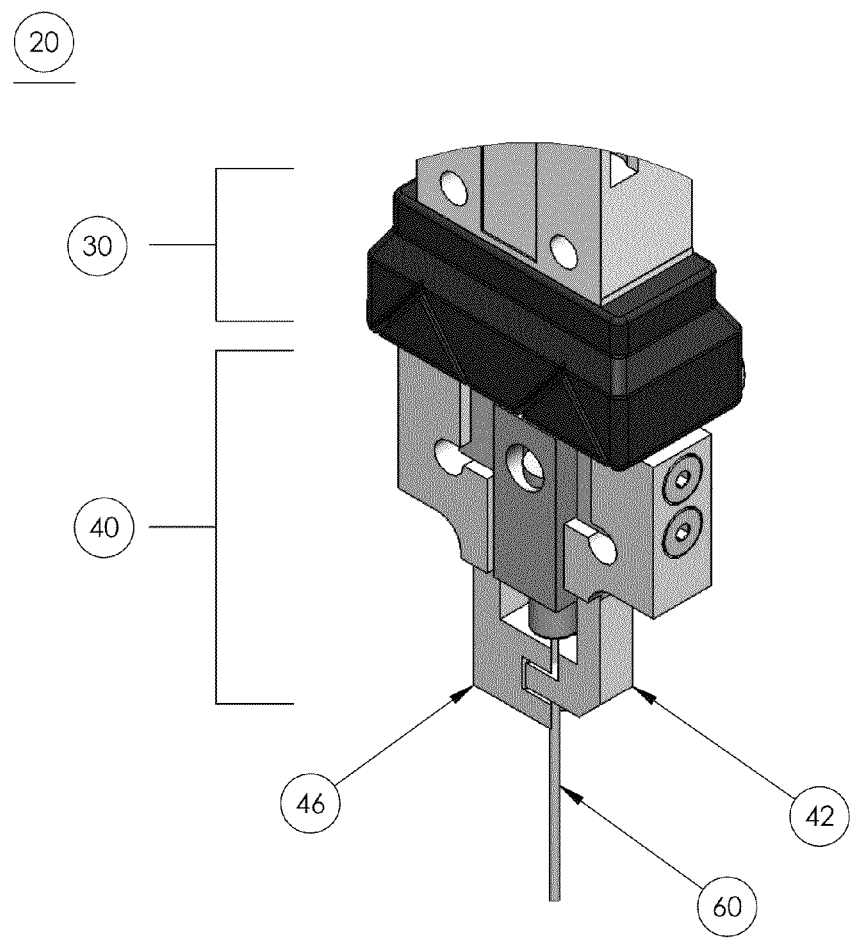

As shown in FIGS. 2A and 2B, in one embodiment, first v-shaped jaw component 42 (see FIG. 2A) can include body 43 having horizontally oriented terminal end 44 that terminates as a v-shaped recess, and second v-shaped jaw component 46 (see FIG. 2B) can include body 47 having two horizontally oriented terminal ends 48a and 48b that both terminate as v-shaped recesses, with one such terminal end 48a being disposed above the other such terminal end 48b at a distance effective to provide space 70 sufficient to fit terminal end 44 of first v-shaped jaw component 42 therebetween. As shown in FIG. 2C, first v-shaped jaw component 42 and second v-shaped jaw component 46 are configured to fit together to form double v-shaped interlocking jaw assembly 40.

Figure 3A:
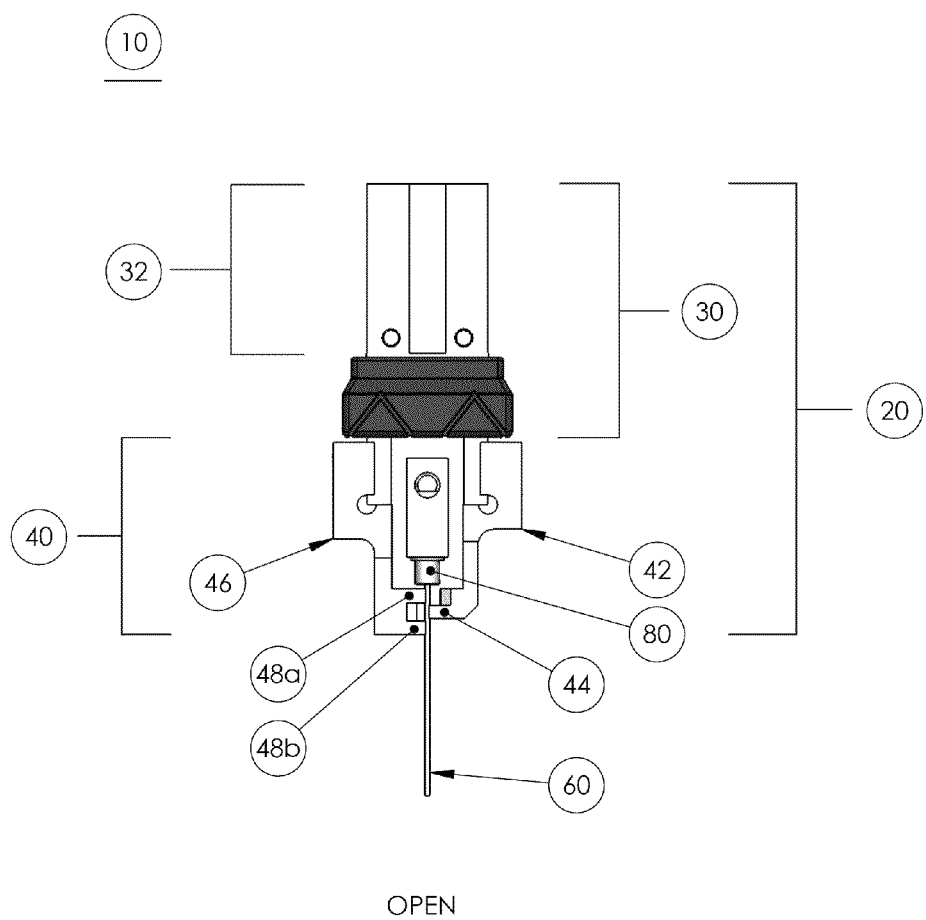
FIGS. 3A and 3B depict profile views of one embodiment of an apparatus of the present invention, where the apparatus is shown having a parallel pneumatic gripper in functional communication with a driver mechanism in accordance with an aspect of the present invention.
Figure 3B:
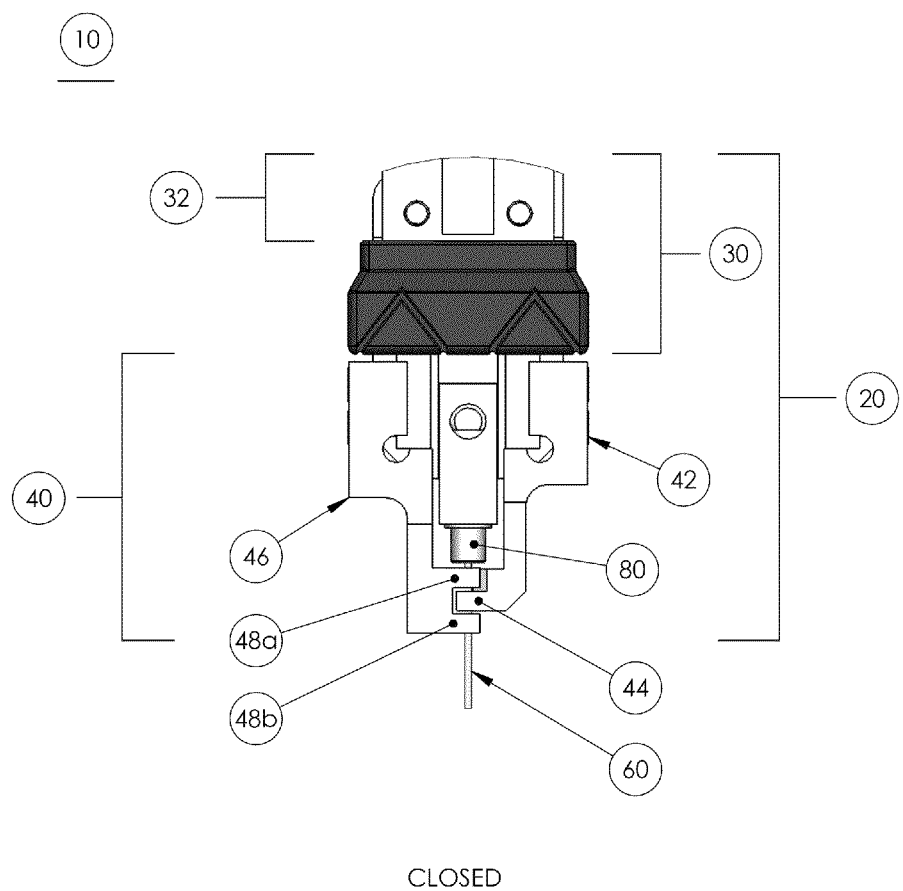
Figure 4A:
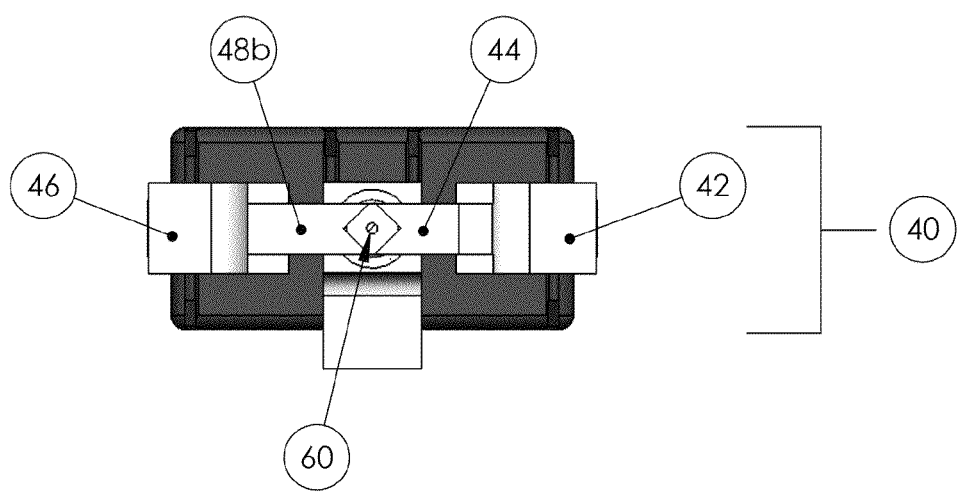
FIGS. 4A and 4B depict bottom views of one embodiment of an apparatus of the present invention, where the apparatus is shown having a parallel pneumatic gripper in functional communication with a driver mechanism in accordance with an aspect of the present invention.
Figure 4B:
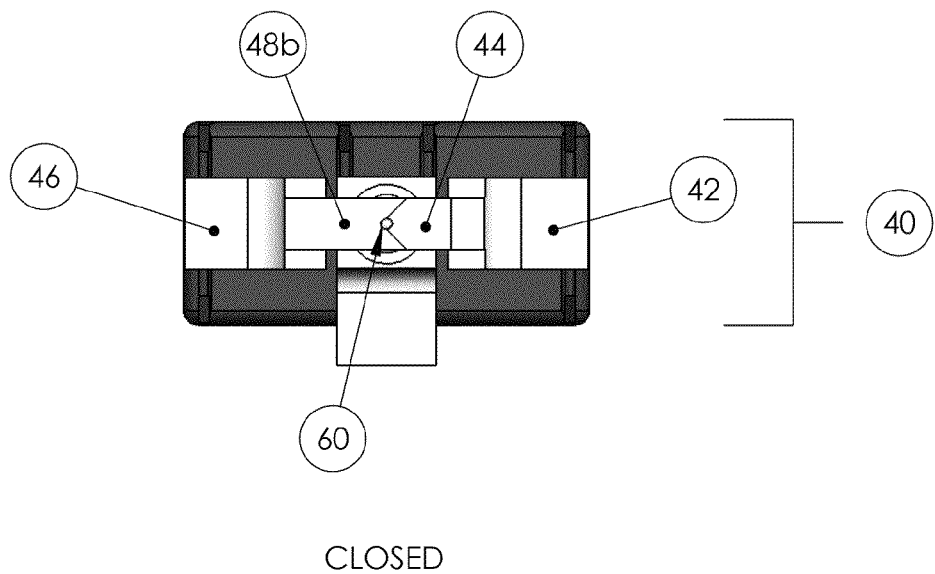

FIGS. 3A, 3B, 4A, and 4B further illustrate the open and closed positions of the double v-shaped interlocking jaw assembly of the present invention. In particular, FIG. 3A illustrates a profile view showing first v-shaped jaw component 42 and second v-shaped jaw component 46 in an open position, while FIG. 3B illustrates the same profile view but showing first v-shaped jaw component 42 and second v-shaped jaw component 46 in a closed position around small rod 60. FIG. 4A illustrates a bottom view of the double v-shaped interlocking jaw assembly in open position, which shows small rod 60 surrounded by but completely free of first v-shaped jaw component 42 and second v-shaped jaw component 46. FIG. 4B illustrates a bottom view of the double v-shaped interlocking jaw assembly in closed position, which shows first v-shaped jaw component 42 and second v-shaped jaw component 46 coming together such that a small rod would be gripped between the jaw components for precision placement of the small rod.

As further shown in FIGS. 3A and 3B, in one embodiment, driver mechanism 30 can include piston system 32 that moves first v-shaped jaw component 42 and second v-shaped jaw component 46 horizontally toward and away from one another in order to effect the closing and opening of the jaw components around rod 60. Also as shown in FIGS. 3A and 3B, in one embodiment, driver mechanism 30 can include backstop component 80 that signals the release of rod 60 from double-v shaped interlocking assembly 40 in response to a compliance force exerted on backstop component 80 by rod 60 when still clamped by double-v shaped interlocking assembly 40. Driver mechanism 30 can be calibrated so that the compliance force ranges from between about 0.01 lbs and about 5.0 lbs. In one embodiment, backstop component 80 is substantially vertical. In a particular embodiment, backstop component 80 is a spring plunger. Suitable spring plungers for use in the present invention are known in the art.

In another aspect, the present invention provides a robotic system for automated gross retrieval and precise placement of a small rod. Various aspects and embodiments of the robotic system are illustratively shown in FIGS. 5-7.

Figure 5A:
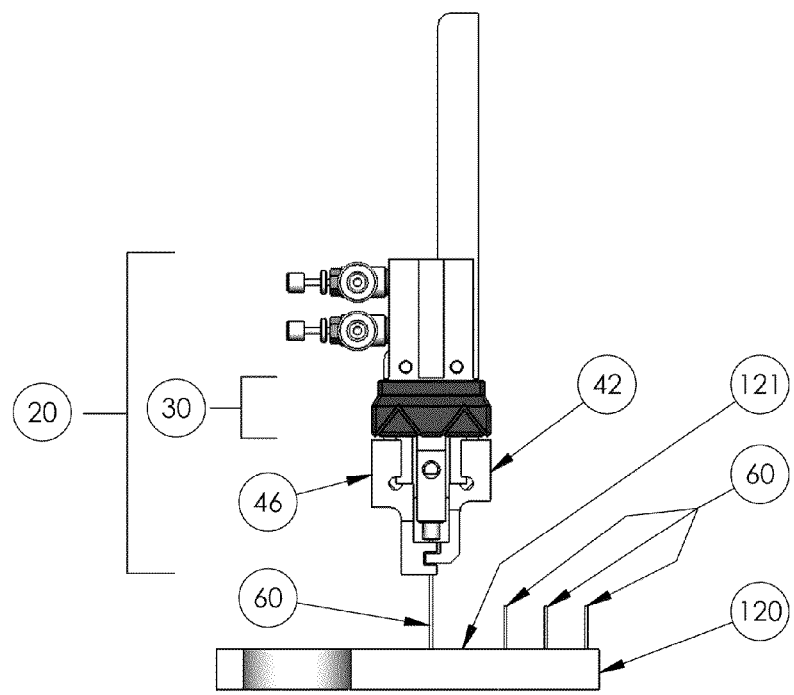
FIGS. 5A and 5B depict various views of an embodiment of an apparatus of the present invention retrieving a small rod from a predetermined location, in accordance with an aspect of the present invention.
Figure 5B:
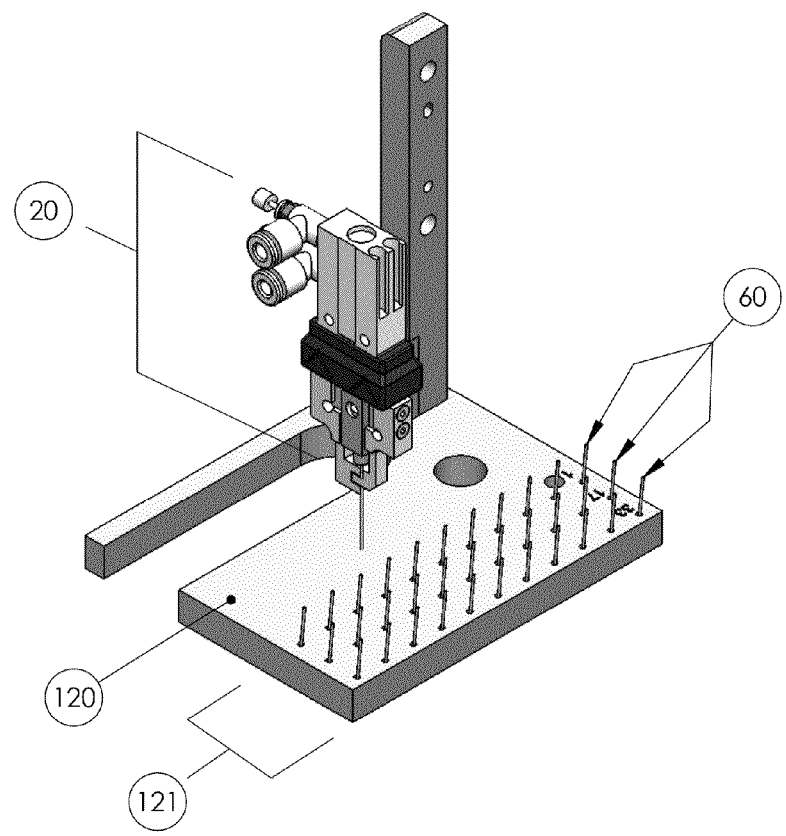
Figure 6A:
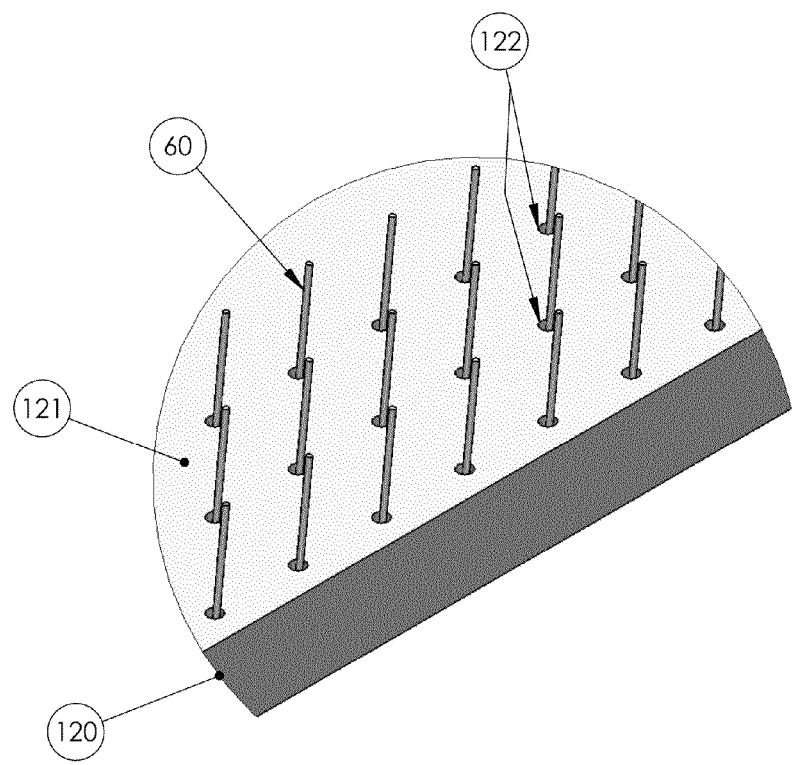
FIGS. 6A, 6B, and 6C depict various views of embodiments of pickup and drop-off zones in accordance with an aspect of the present invention.
Figure 6B:
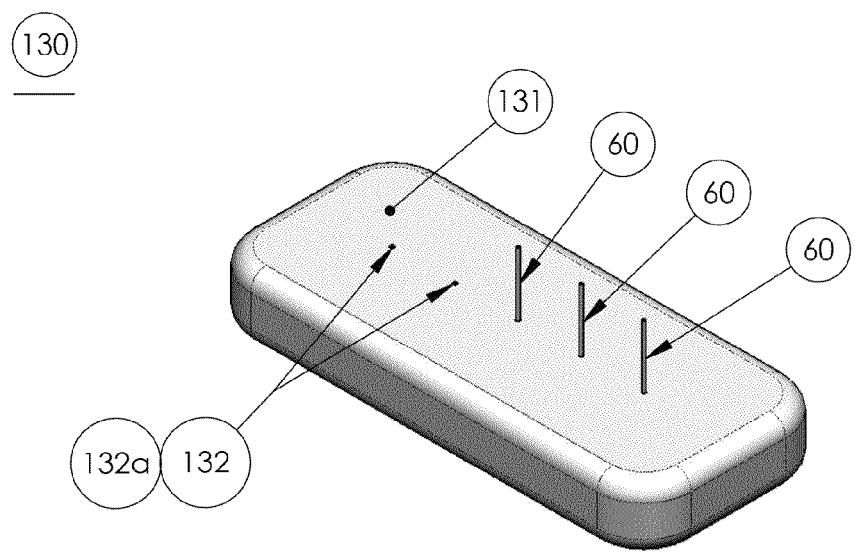
Figure 6C:
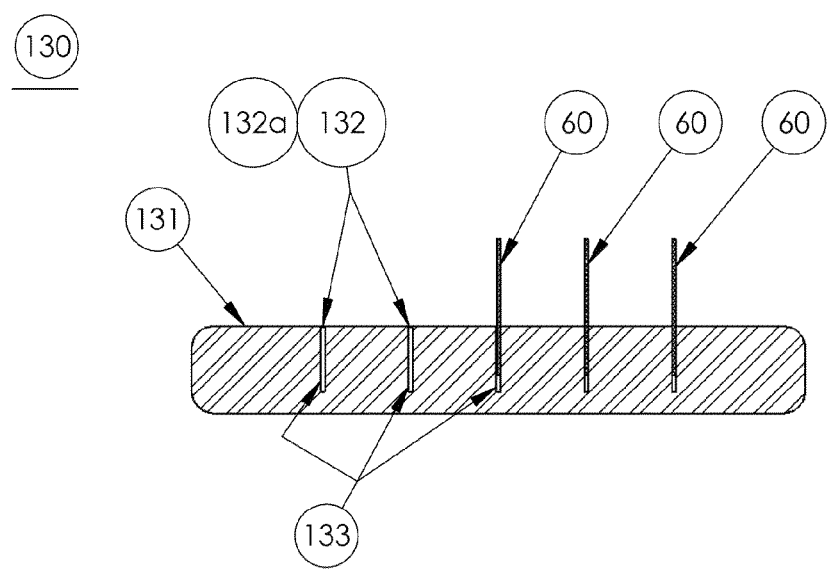

In one embodiment, the robotic system of the present invention includes a programmable robot and a parallel pneumatic gripper coupled to the programmable robot. In a particular embodiment, the robotic system of the present invention can include a programmable robot, a parallel pneumatic gripper, and pickup zone 120 having stage 121 adapted to provide the at least one small rod 60 in a substantially vertical position for gross retrieval thereof by parallel pneumatic gripper 20 (see FIGS. 5A, 5B, and 6A). As shown in FIGS. 6B and 6C, in another embodiment, the robotic system of the present invention can include a programmable robot, a parallel pneumatic gripper, and drop-off zone 130 having platform 131 that includes at least one predetermined location 132 for precise placement of the at least one small rod 60 in a substantially vertical position at a predetermined depth 133. In yet another embodiment, the robotic system of the present invention can include a programmable robot, a parallel pneumatic gripper, a pickup zone, and a drop-off zone.

Suitable programmable robots for use in this aspect of the present invention are known in the art and can be adapted by one of ordinary skill in the art to operate in conjunction with the parallel pneumatic gripper of the present invention. Examples of programmable robot technology have been described in various patent disclosures, including, for example, in U.S. Pat. No. 4,789,292 to Holcomb and U.S. Pat. No. 4,955,655 to Caracciolo, Jr. et al., which are hereby incorporated by reference in their entirety.

Figure 7A:
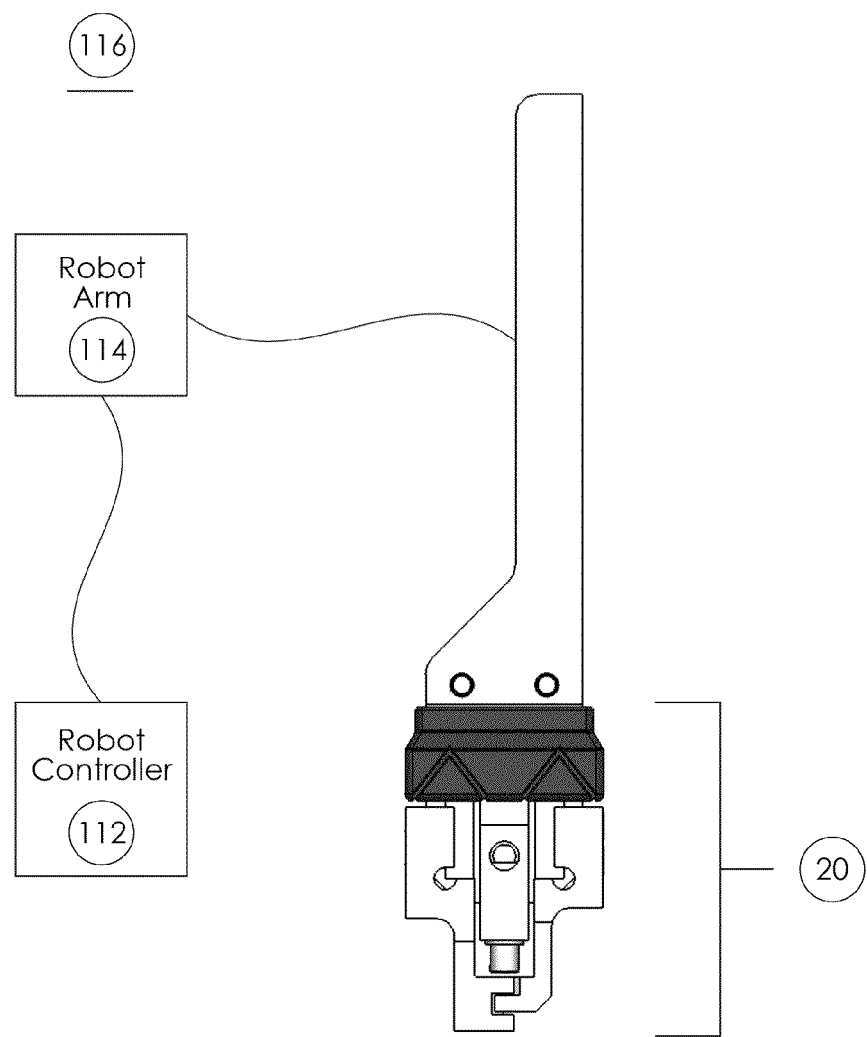
FIGS. 7A and 7B depict various views of a robotic system of the present invention.
Figure 7B:
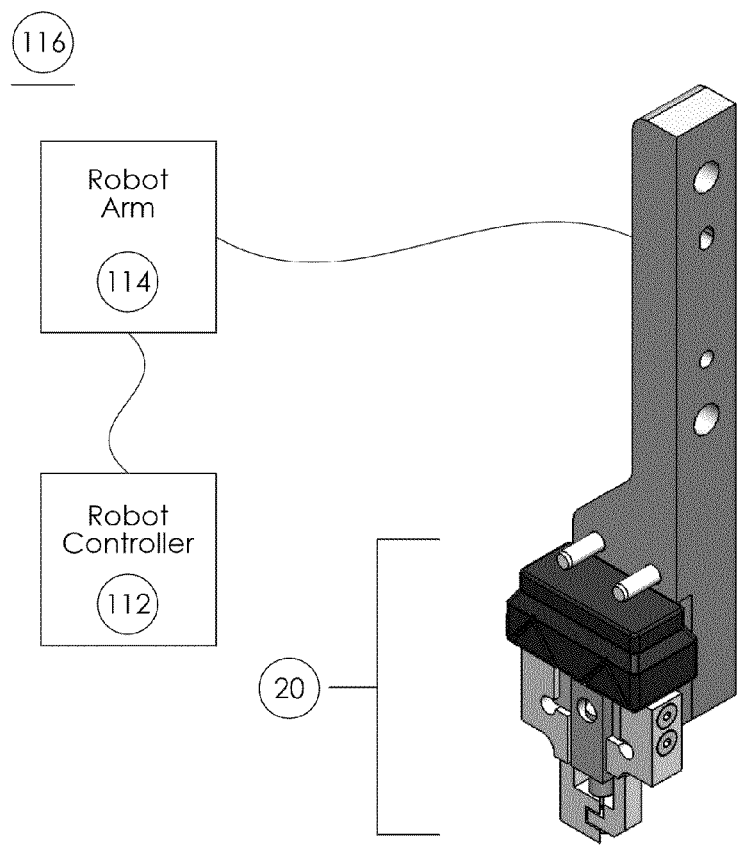

As shown in FIGS. 7A and 7B, in one embodiment, the programmable robot 110 includes robot controller 112, robot arm 114, and end effector 116 coupled thereto. According to the present invention, controller 112 is adapted to control robot arm 114 and end effector 116 through a predetermined sequence of movements to sequentially pick up at least one small rod from a pickup zone and release it at a precise location on a drop-off zone. In operation, parallel pneumatic gripper 20 can be coupled to end effector 116.

In particular, returning to FIGS. 1A, 1B, 2A, 2B, 2C, 3A, 3B, 4A, and 4B, driver mechanism 30 and double-v shaped interlocking jaw assembly 40 of parallel pneumatic gripper 20 are configured to receive, secure, and release at least one small rod 60 in a substantially vertical position in response to corresponding signals generated by driver mechanism 30. As provided herein, double-v shaped interlocking jaw assembly 40 of parallel pneumatic gripper 20 includes first v-shaped jaw component 42 and second v-shaped jaw component 46 that, when signaled to close by driver mechanism 30, translate toward each other and surround rod 60 and interlock at their terminal ends (terminal end 44 of body 43 and terminal ends 48a, 48b of body 47) to clamp rod 60 therebetween in a substantially vertical position.

In one embodiment, the robotic system of the present invention includes both a pickup zone and a drop-off zone. Thus, for example, the robotic system can include a pickup zone having a stage adapted to provide at least one small rod in a substantially vertical position for gross retrieval thereof by a parallel pneumatic gripper according to the present invention. The robotic system can also include a drop-off zone having a platform that includes at least one predetermined location for precise placement of at least one small rod in a substantially vertical position at the predetermined depth (see FIGS. 6B and 6C).

In another aspect, the present invention provides a process for automated gross retrieval of at least one small rod and subsequent precise substantially vertical placement thereof into a platform at a predetermined location and at a predetermined depth. Various aspects and embodiments of this process are described below. Further, as described herein, the apparatus and robotic system of the present invention are suitable for use in the process.

In general, as provided herein, the process for automated gross retrieval of at least one small rod and subsequent precise substantially vertical placement thereof into a platform at a predetermined location and at a predetermined depth involves the following steps: (i) providing a robotic system of the present invention; (ii) supplying at least one small rod in a substantially vertical position on the stage of the pickup zone of the robotic system; (iii) securing the at least one small rod in a substantially vertical position in the double-v shaped interlocking jaw assembly of the parallel pneumatic gripper of the robotic system; and (iv) depositing the at least one small rod in a substantially vertical position in a predetermined location and at a predetermined depth on the platform of the drop-off zone of the robotic system.

In one embodiment, the securing step of this process involves the following steps: positioning the double-v shaped interlocking jaw assembly in an open position above the at least one small rod; moving the opened jaw assembly downwardly to a predetermined lengthwise position around the rod; and closing the jaw assembly around the rod so as to clamp the rod between the first and second v-shaped components of the jaw assembly.

In one embodiment, the depositing step of this process involves the following steps: positioning the jaw assembly above the platform of the drop-off zone so that the at least one small rod secured in the jaw assembly is directly above the predetermined location of the platform; moving the jaw assembly downwardly until the rod is partially inserted at an interim depth into the platform at the predetermined location; opening the jaw assembly to de-clamp the rod while still moving the jaw assembly downwardly; and continuing to move the jaw assembly downwardly until the rod is inserted into the platform to the predetermined depth.

As set forth herein, in regard to the operation of the process of the present invention, the backstop component of the driver mechanism of the parallel pneumatic gripper functions to detect when the rod has been inserted into the platform at the predetermined depth.

In one embodiment, the process involves repeating the above-described providing, supplying, securing, and depositing steps in order to precisely place a plurality of small rods at predetermined locations and depths in the platform of the drop-off zone.

With regard to the supplying step, in one embodiment, the stage of the pickup zone includes a plurality of holes. A plurality of small rods is contained in the various holes of the stage of the pickup zone. As shown in FIGS. 5A, 5B, and 6A, a plurality of small rods 60 is in a substantially vertical position. As shown in FIGS. 5A, 5B, 6A, 6B, and 6C, this positioning allows for the use of the robotic system of the present invention to retrieve the plurality of small rods 60 from holes 122 of stage 121 of pickup zone 120 in a repeatable fashion for placement into holes 132a of platform 131 of drop-off zone 130. For example, using the robotic system of the present invention, small rod 60 is secured in a substantially vertical position in double-v shaped interlocking jaw assembly 40 of parallel pneumatic gripper 20 of the robotic system.

With regard to the securing step, in a particular embodiment, the securing step of the process of the present invention involves positioning the double-v shaped interlocking jaw assembly in an open position above a small rod. The jaw assembly is then moved in the open position downwardly to a predetermined lengthwise position around the small rod. Thereafter, the jaw assembly is closed around the small rod so as to clamp the rod between the first v-shaped component and the second v-shaped component of the jaw assembly.

With regard to the depositing step, in a particular embodiment, the depositing step of the process of the present invention also involves depositing the small rods in a substantially vertical position in a predetermined location (e.g., holes) and at predetermined depths on the platform of the drop-off zone of the robotic system of the present invention. In particular, in this embodiment of the process of the present invention, the depositing step can involve positioning the jaw assembly above the platform of the drop-off zone so that the small rod that is secured in the jaw assembly is directly above the predetermined location (e.g., hole) of the platform. The jaw assembly is then moved downwardly until the small rod is partially inserted at an interim depth into the platform at a predetermined location (e.g., hole). The jaw assembly is then opened in order to de-clamp the small rod from the first v-shaped jaw component and the second v-shaped jaw component while still moving the jaw assembly downwardly. The jaw assembly continues to move downwardly until the small rod is inserted into the predetermined location (e.g., hole) of the platform to the predetermined depth.

As set forth above, the steps of providing, supplying, securing, and depositing steps can be repeated until all of the small rods are retrieved from the pickup zone and precisely placed at the predetermined locations and at the predetermined depths in the platform of the drop-off zone.

To further illustrate the operation of the apparatus and robotic system of the present invention in the process of the present invention, provided below is a general description of these aspects as they relate to one another.

For example, small rods are placed into trays and, more particularly, into relatively large clearance holes in the trays. The placement of the small rods in these clearance holes provides a rough positioning of the small rods, with the small rods being maintained in the clearance holes in a substantially vertical position. The parallel pneumatic gripper of the present invention (i.e., the parallel pneumatic gripper of the apparatus and the robotic system of the present invention) is then robotically moved to a position above a small rod contained in a clearance hole of the tray. At this stage in the process, the double-v shaped interlocking jaw assembly is in an open position effective to receive the small rod. The parallel pneumatic gripper is then moved down around the small rod at an angle to a specific height, although the actual height at this stage is not a critical parameter. The robotic system then moves the parallel pneumatic gripper to the center of the clearance hole where the jaw assembly closes and clamps onto the small rod. In operation, the closing of the jaw assembly around the small rod ensures that the small rod is located in a repeatable position within jaw assembly of the parallel pneumatic gripper.

The robotic system (via the parallel pneumatic gripper) then lifts the small rod out of the tray and moves it to a centered position above a precision hole (of the drop-off zone) that corresponds to a precise predetermined location of the drop-off zone. Aided by the programmable robot, the parallel pneumatic gripper moves the clamped small rod down to the precision hole, partially inserting the rod into the hole, but only to the depth of the lead-in to the precision hole (e.g., to an interim depth as described herein). Thereafter, the jaw assembly of the parallel pneumatic gripper opens, but still contains the small rod within the jaw assembly, even though the jaw assembly is no longer clamping the small rod.

Aided by the programmable robot, the parallel pneumatic gripper then continues down, pushing the small rod into the precision hole. When the small rod contacts the bottom of the hole, the top side of the small rod pushes against the backstop component (e.g., a spring plunger) of the parallel pneumatic gripper. The parallel pneumatic gripper then continues down to a fixed position, thereby ensuring that the small rod has been seated to the bottom of the precision hole. Thereafter, aided by the programmable robot, the parallel pneumatic gripper (no longer clamping a small rod) returns to the pickup zone (e.g., the tray having small rods contained in clearance holes) ready to retrieve another small rod and to repeat the retrieval and placement process as described above.

While embodiments of the invention have been illustrated and described in detail in the disclosure, the disclosure is to be considered as illustrative and not restrictive in character. All changes and modifications that come within the spirit of the invention are to be considered within the scope of the disclosure.

What is claimed is:

1. An apparatus for automated vertical placement of a small rod at a predetermined location, said apparatus comprising:
    a parallel pneumatic gripper comprising a driver mechanism and a double-v shaped interlocking jaw assembly configured to receive, secure, and release a small rod in a substantially vertical position in response to corresponding signals generated by the driver mechanism,
    wherein said driver mechanism comprises a substantially vertical backstop component that signals the release of the rod from the double-v shaped interlocking assembly in response to a compliance force exerted on the backstop component by the rod when still clamped by the double-v shaped interlocking assembly, and
    wherein said double-v shaped interlocking jaw assembly comprises a first v-shaped jaw component and a second v-shaped jaw component that, when signaled to close by the driver mechanism, translate toward each other and surround said rod and interlock at their terminal ends to clamp the rod therebetween in a substantially vertical position.

2. The apparatus according to claim 1, wherein said first v-shaped jaw component comprises a body having a horizontally oriented terminal end that terminates as a v-shaped recess, and
    wherein said second v-shaped jaw component comprises a body having two horizontally oriented terminal ends that both terminate as v-shaped recesses, with one such terminal end being disposed above the other such terminal end at a distance effective to provide a space sufficient to fit the terminal end of the first v-shaped jaw component therebetween.

3. The apparatus according to claim 1, wherein said driver mechanism comprises a piston system that moves the first and second v-shaped jaw components horizontally toward and away from one another in order to effect the closing and opening of the jaw components around the rod.

4. The apparatus according to claim 1, wherein said substantially vertical backstop component is a spring plunger.

5. The apparatus according to claim 1, wherein said compliance force ranges from between about 0.01 lbs and about 5.0 lbs.

6. The apparatus according to claim 1, wherein said rod has a substantially circular cross section and has a diameter that ranges from between about 0.020 inches and about 0.20 inches.

7. The apparatus according to claim 1, wherein said rod has a substantially square cross section and has a diagonal that ranges from between about 0.020 inches and about 0.20 inches.

8. The apparatus according to claim 1, wherein said rod has a length that ranges from between about 0.25 inches and about 3.0 inches.

9. A robotic system for automated gross retrieval and precise placement of a small rod, said system comprising:
- a programmable robot comprising a robot controller, a robot arm, and an end effector coupled thereto, the controller adapted to control the robot arm and end effector through a predetermined sequence of movements to sequentially pick up at least one small rod from a pickup zone and release it at a precise location on a drop-off zone; and
- a parallel pneumatic gripper coupled to the end effector, said parallel pneumatic gripper comprising a driver mechanism and a double-v shaped interlocking jaw assembly configured to receive, secure, and release the at least one small rod in a substantially vertical position in response to corresponding signals generated by the driver mechanism,
- wherein said driver mechanism comprises a substantially vertical backstop component that signals the release of the rod from the double-v shaped interlocking assembly in response to a compliance force exerted on the backstop component by the rod when still clamped by the double-v shaped interlocking assembly, and
- wherein said double-v shaped interlocking jaw assembly comprises a first v-shaped jaw component and a second v-shaped jaw component that, when signaled to close by the driver mechanism, translate toward each other and surround said rod and interlock at their terminal ends to clamp the rod therebetween in a substantially vertical position.

10. The robotic system according to claim 9 further comprising:
- a pickup zone comprising a stage adapted to provide the at least one small rod in a substantially vertical position for gross retrieval thereof by the parallel pneumatic gripper.

11. The robotic system according to claim 10, wherein said pickup zone comprises a tray having at least one hole for holding the at least one small rod in a substantially vertical position.

12. The robotic system according to claim 9 further comprising:
- a drop-off zone comprising a platform having at least one predetermined location for precise placement of the at least one small rod in a substantially vertical position at a predetermined depth.

13. The robotic system according to claim 12, wherein said drop-off zone comprises a tray having at least one hole for receiving the at least one small rod and maintain the rod in a substantially vertical position.

14. The robotic system according to claim 9 further comprising:
- a pickup zone comprising a stage adapted to provide the at least one small rod in a substantially vertical position for gross retrieval thereof by the parallel pneumatic gripper; and
- a drop-off zone comprising a platform having at least one predetermined location for precise placement of the at least one small rod in a substantially vertical position at a predetermined depth.

15. A process for automated gross retrieval of at least one small rod and subsequent precise substantially vertical placement thereof into a platform at a predetermined location and at a predetermined depth, said process comprising:
- (a) providing a robotic system according to claim 14;
- (b) supplying at least one small rod in a substantially vertical position on the stage of the pickup zone of the robotic system;
- (c) securing the at least one small rod in a substantially vertical position in the double-v shaped interlocking jaw assembly of the parallel pneumatic gripper of the robotic system; and
- (d) depositing the at least one small rod in a substantially vertical position in a predetermined location and at a predetermined depth on the platform of the drop-off zone of the robotic system.

16. The process according to claim 15, wherein said securing step comprises:
- positioning the double-v shaped interlocking jaw assembly in an open position above the at least one small rod;
- moving the opened jaw assembly downwardly to a predetermined lengthwise position around the rod; and
- closing the jaw assembly around the rod so as to clamp the rod between the first and second v-shaped components of the jaw assembly.

17. The process according to claim 15, wherein said depositing step comprises:
- positioning the jaw assembly above the platform of the drop-off zone so that the at least one small rod secured in the jaw assembly is directly above the predetermined location of the platform;
- moving the jaw assembly downwardly until the rod is partially inserted at an interim depth into the platform at the predetermined location;
- opening the jaw assembly to de-clamp the rod while still moving the jaw assembly downwardly; and
- continuing to move the jaw assembly downwardly until the rod is inserted into the platform to the predetermined depth.

18. The process according to claim 15, wherein a backstop component of the driver mechanism of the parallel pneumatic gripper functions to detect when the rod has been inserted into the platform at the predetermined depth.

19. The process according to claim 15, wherein said providing, supplying, securing, and depositing steps are repeated in order to precisely place a plurality of small rods at predetermined locations and depths in the platform of the drop-off zone.

* * * * *